(12) United States Patent
May

(10) Patent No.: US 7,219,564 B1
(45) Date of Patent: *May 22, 2007

(54) MAGNETISED TRANSDUCER ELEMENT FOR TORQUE OR FORCE SENSOR

(75) Inventor: Lutz Axel May, Gelting (DE)

(73) Assignee: Abas, Incorporated, Chicago, IL (US)

( * ) Notice: Subject to any disclaimer, the term of this patent is extended or adjusted under 35 U.S.C. 154(b) by 346 days.

This patent is subject to a terminal disclaimer.

(21) Appl. No.: 10/049,322

(22) PCT Filed: Aug. 14, 2000

(86) PCT No.: PCT/GB00/03125

§ 371 (c)(1),
(2), (4) Date: Jul. 17, 2002

(87) PCT Pub. No.: WO01/13082

PCT Pub. Date: Feb. 22, 2001

(30) Foreign Application Priority Data

Aug. 12, 1999 (GB) ................................. 9919065.4

(51) Int. Cl.
*G01L 3/02* (2006.01)
(52) U.S. Cl. ................................................ 73/862.333
(58) Field of Classification Search ........... 73/862.193, 73/862.328–862.336
See application file for complete search history.

(56) References Cited

U.S. PATENT DOCUMENTS

| | | | | |
|---|---|---|---|---|
| 4,150,653 A * | 4/1979 | Grancoin | ..................... | 123/617 |
| 4,206,374 A * | 6/1980 | Goddijn | ..................... | 310/49 R |
| 4,379,598 A * | 4/1983 | Goldowsky | ................ | 310/90.5 |
| 4,479,390 A * | 10/1984 | Meixner | ................ | 73/862.333 |
| 4,697,460 A | 10/1987 | Sugiyama et al. | ........ | 73/862.36 |
| 4,803,885 A * | 2/1989 | Nonomura et al. | .... | 73/862.333 |
| 5,263,558 A * | 11/1993 | Yamaoka | ..................... | 188/267 |
| 5,388,526 A * | 2/1995 | Imai | ......................... | 104/138.1 |
| 5,520,059 A * | 5/1996 | Garshelis | ................ | 73/862.335 |
| 5,672,834 A * | 9/1997 | Searle et al. | ........... | 73/862.338 |
| 6,145,387 A * | 11/2000 | Garshelis | ............... | 73/862.336 |
| 6,389,910 B1 * | 5/2002 | Eisenhauer | ............ | 73/862.193 |
| 6,513,395 B1 * | 2/2003 | Jones | ..................... | 73/862.333 |
| 6,781,269 B1 * | 8/2004 | Shimada | .................... | 310/90.5 |
| 6,910,391 B1 * | 6/2005 | May | ..................... | 73/862.333 |
| 6,952,058 B2 * | 10/2005 | McCoin | ........................ | 290/44 |
| 2003/0150282 A1 * | 8/2003 | May | ..................... | 73/862.331 |

FOREIGN PATENT DOCUMENTS

| | | | |
|---|---|---|---|
| JP | 05122896 A | * | 5/1993 |
| JP | 08128445 A | * | 5/1996 |
| WO | WO 99 40403 | | 8/1999 |

* cited by examiner

*Primary Examiner*—Max Noori
(74) *Attorney, Agent, or Firm*—Blank Rome LLP

(57) ABSTRACT

A magnetic torque transducer for a structure such as a disc through which torque is transmitted between a central shaft to which the disc is mounted and an outer periphery such as a gear wheel. The intervening region through which torque is transmitted is magnetized to provide a transducer element having two magnetized, annular regions which cooperate to emanate a magnetic field that is torque-dependent. The two magnetized regions may be longitudinally-magnetized through the disc or circumferentially magnetized with opposite polarities. A sensor assembly of non-contacting sensors is used to detect the emanated field and connected in circuitry to provide a torque-dependent signal. In an alternative a single magnetized annular region is employed. The annular region or regions need not be a complete annulus. The same disc-like structure can also be used as force sensor for measuring bending moments or other forces which result in stress occurring in the disc.

25 Claims, 4 Drawing Sheets

MAGNETISED TRANSDUCER ELEMENT FOR TORQUE OR FORCE SENSOR

This invention relates to a transducer element suitable for use in a torque or force sensor transducer and to a transducer arrangement incorporating the element.

BACKGROUND TO THE INVENTION

One approach to non-contactless sensing of torque in a shaft rotating about its axis is a torque sensor based on magnetoelasticity. A magnetoelastic transducer element is secured to or integral with the shaft, the torque in which is to be measured, and a torque-dependent magnetic field emanated by the transducer element is detected by a sensing device external to the shaft, but not in contact with the shaft, and responsive to the emanated magnetic field. Examples of sensing devices are a Hall effect device, a saturating coil sensor, or various of other magnetic field sensitive devices known in the art. It will be understood that in practice a sensing device may be an assembly of devices. For example, a plurality of sensing devices may be disposed about the axis of the shaft and interconnected to be additive with respect to the torque-dependent field but to cancel in respect of external fields such as the Earth's magnetic field.

Magnetoelastic transducer elements form a ring or annulus which is circumferentially magnetised. The field forms a closed loop normally contained within the element.

One form of transducer element is a separate ring of magnetoelastic material attached to the shaft such as disclosed in U.S. Pat. Nos. 5,351,555, 5,465,627 and 5,520,059, all assigned to Garshelis and assigned to Magnetoelastic Devices, Inc. In the ring transducer elements, the ring supports a circumferential magnetic field which is confined within the ring, that is no field is detectable externally in the absence of torque. When torque in the shaft is transmitted to the magnetoelastic ring, an external magnetic field is emanated and is detected by a sensor arrangement.

A different approach to providing a circumferentially magnetised magnetoelastic sensor is disclosed in International Patent Application PCT/GB99/00736 (published on 4th Nov., 1999 under the number WO99/56099) in which the transducer element is an integral portion of the shaft whose torque is to be measured. This avoids problems in securing a separate ring properly to the shaft. An integral transducer element approach is also disclosed in published International Patent Applications WO99/21150 and WO99/21151.

Magnetoelasticity is a phenomenon which, as yet, is apparently still not fully understood and explained. It is, therefore, generally desirable to find other forms of magnetisation that might be employed in transducer elements, particularly suitable for torque sensing.

In an alternative to circumferential magnetisation one or more magnetic transducer elements are provided integrally in a shaft of magnetisable material but using longitudinal magnetisation, that is a magnetisation that lies in an axial direction in contrast to circumferential magnetisation. The longitudinal magnetisation is applied to an annular region of a shaft or more than one such region.

Longitudinal magnetisation is the subject of our copending International application PCT/GB00/03119 filed concurrently herewith and published under the number WO01/13081.

Both circumferential magnetisation and longitudinal magnetisation have been primarily applied to shafts or similar parts where torque is transmitted through the magnetised region in the direction of the shaft axis, e.g. a load transmitting shaft having torque applied at one end and a load at the other end.

There is a need to measure torque in parts in which the load transmission is essentially radial. An example is a disc-like structure mounted on a driven shaft and having drive means at its outer periphery, such as gear teeth. The drive may be in the opposite direction.

One proposal for torque measurement in an automobile transmission is disclosed in U.S. Pat. No. 4,697,460 (Sugiyama et al). An energiser coil/detection coil assembly is non-contactingly placed adjacent a disc in which torque stress occurs. The energising coil is A. C. energised to establish an alternating magnetic flux in a flux path through the disc that is torque sensitive. The detection coil senses torque-dependent changes in the circulating magnetic flux.

SUMMARY OF THE INVENTION

The present invention enables us to provide a number of solutions to this problem by means of a magnetic transducer element or elements located in a radially extending torque transmission path. To this end the transducer element may be formed in a plate or disc in which at least one major surface of the plate or disc is cooperable with a magnetic field sensor arrangement.

The present invention also includes the concept of measuring the bending force or the shear force in an disc-like or plate-like member subject to a bending or shearing moment.

Aspects and features of the present invention for which protection is sought are set out in the accompanying claims.

BRIEF DESCRIPTION OF THE DRAWINGS

In order that the present invention may be better understood, embodiments of it will now be described with reference to the accompanying drawings, in which.

DESCRIPTION OF PREFERRED EMBODIMENTS OF THE INVENTION

Figure 1:
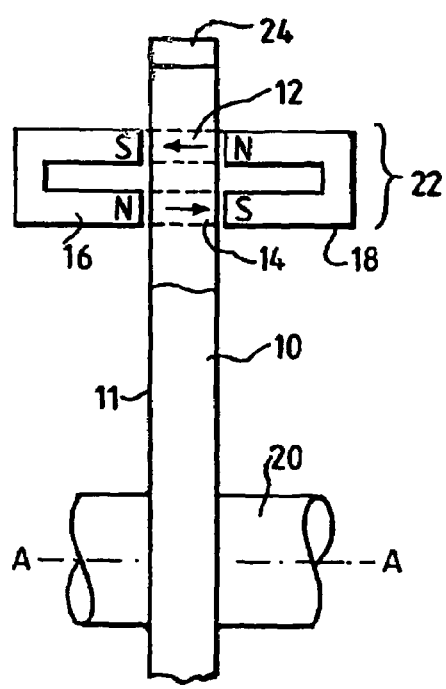
FIG. 1 shows a side view of an embodiment of the invention using a disc-like member in which the transducer element is formed.

In the embodiments to be described like parts bear like reference numerals.

The following description will describe a number of different forms or modes of magnetisation which may be employed in sensing torque or other forces. For consistent and reliable measurement, it is preferred that the structure to be magnetised be first subject to a pre-magnetisation procedure described below with reference to FIG. 12 and possibly also to a post-magnetisation procedure also described below.

FIG. 1 shows a diametric section through a circular disc 10 which is to be subject to torque about an axis A—A. The disc is of magnetisable material, or at least the annular region 22 of it is. Adjacent its periphery the disc is magnetised through its thickness to have two radially spaced regions 12 and 14 of opposite polarity. This can be obtained by rotating the disc 10 between a pair of magnets (permanent or electromagnet) 16 and 18 with opposite poles facing each other through the disc. Thus each region 12 and 14 is an annulus of magnetisation. Together they provide a transducer element or region 22. To some extent the magnetic flux will tend to close in a loop including both regions, not unlike a toroidal flux pattern. This assumes the disc has a relatively high magnetic permeability. However, the loop concept must not be taken too far because the overall annular magnetised region 22 is bounded by low permeability air at each side. Thus flux will emerge from the disc surface into the air medium. The performance of the sensor can be improved by profiling the disc such that the magnetised annular regions are thicker than the regions between them or by closing the flux path on the non-sensor side of the disc as will be further described.

Further, by changing the profile of the annular regions in a circumferential direction, there will be a change in the magnitude of the magnetic field as the disc rotates. This can be used to detect rotational velocity of the disc.

Figure 2:
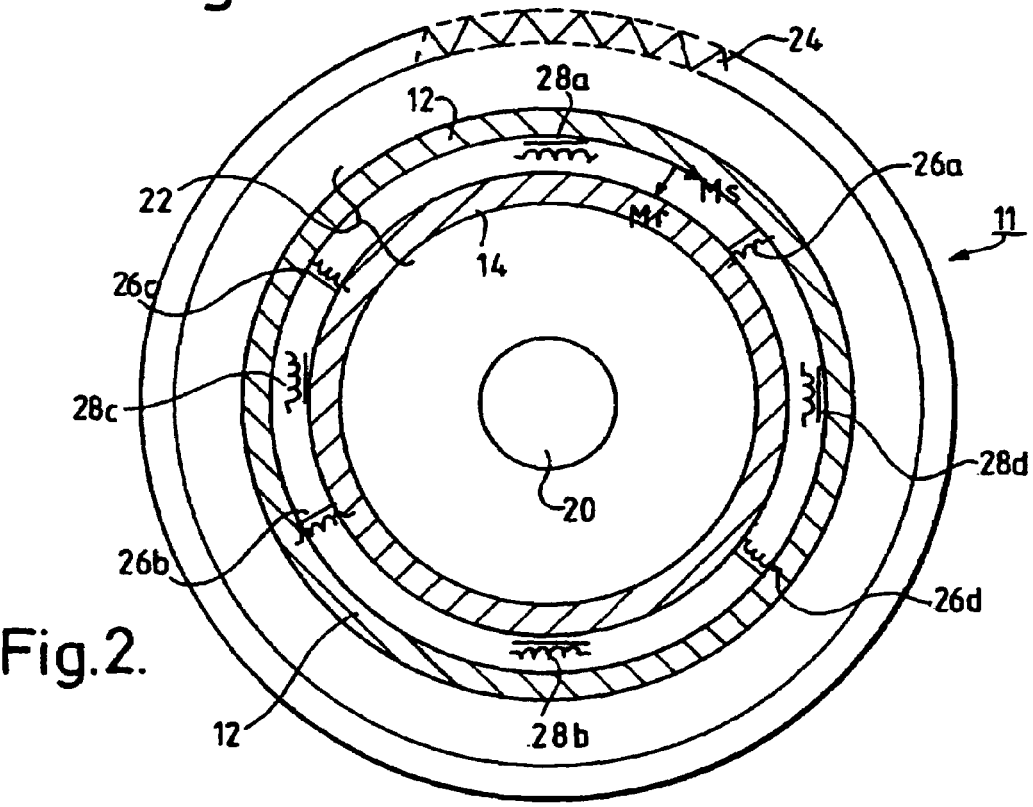
FIG. 2 is a face view of the transducer assembly side of the disc seen in FIG. 1.

FIG. 2 shows a view of one surface 11 of the disc with the regions 12, 14 shown in hatched line. It will be seen that the magnetic flux exterior to the surface and linking regions 12 and 14 will lie radially. This flux is indicated as Mr in FIG. 3. Consider now a use for the disc in which it is being used to transmit torque from a shaft 20, to which it is secured to rotate therewith about axis A—A, to provide drive at the periphery of the disc, formed as a gear wheel 24 for example. The torque transmitted through the disc will tend to deflect or skew the radial field component Mr shown in FIG. 3 to be slightly offset from the radial direction as indicated by Mr'. Mr' can be resolved into a radial component and orthogonal component Ms acting in a circumferential direction with respect to annular sensing region 122. The magnitude and direction of Ms is dependent on the magnitude and direction of the applied torque. This situation would apply equally to the transmission of drive from the outer periphery of the disc to the central shaft.

Referring again to FIG. 2 the radial field Mr can be detected by a sensor 26a,26b,26c,26d radially oriented, and the Ms component measured by a sensor 28a,28b,28c,28d at right angles to the radial direction. These sensors will be placed in fixed positions with respect to the disc rotating past them in non-contacting fashion.

Depending on the drive arrangement and the distribution of stresses in the disc more pairs of non-contacting sensors 26a,26b,26c,26d, and 28a,28b,28c,28d may be provided angularly displaced around the disc. FIG. 2 shows four such pairs of non-contacting sensors.

It will also be apparent that the torque sensor arrangement described can be used to measure torque in the shaft 20 communicated to the disc when the outer periphery is held fixed or say under a braking force, or when torque is applied to the periphery and the shaft 20 is fixed or braked.

The orientation of a pair of diametrically opposite Ms sensors 28a, 28b produce Ms components such that the sensors can be connected to add as far as Ms components are concerned but cancel the effects of an external field such as the Earth's magnetic field. The use of four sensors 28a–d in two orthogonally arranged pairs enables the cancellation of external fields from any direction while adding the Ms components.

The use of multiple radial sensors 26 for the reference components Mr, particularly four sensors in two orthogonally arranged pairs, also enables connection in a manner providing cancellation of any external field. The location of sensors to add wanted field components while cancelling external fields is discussed further in aforementioned concurrently filed PCT application PCT/GB00/03119 published under the number WO01/13081.

The sensor devices for the transducer assembly are to one side of the disc 10. The magnetic efficiency can be enhanced by closing the magnetic path on the other side by a member providing an annulus of high permeability material to bridge regions 12 and 14.

Figure 4:
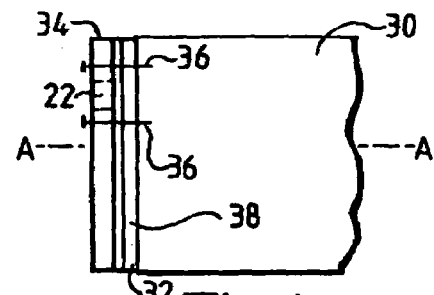
FIG. 4 is a modification of the embodiment of FIG. 1.
Figure 3:
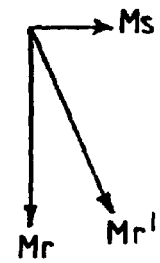
FIG. 3 is a vector diagram showing radial and circumferential fields.

In the embodiment of FIGS. 1 to 3, the disc is directly used as a load transmitting member. A disc or other plate-like member appropriately magnetised may also be used for torque measurement by securing the disc or plate to a load transmitting part or any part subject to a torque in its operation. For example FIG. 4 shows a part 30 which is revolving about an axis A—A so as to create a torque in the part. The part has a surface 32 at which the stresses due to the torque are expressed and a disc 34 of the kind shown in FIG. 2 is affixed to the surface 32. The disc 34 must be securely fixed to the surface, e.g. by screws 36, both radially inwardly and outwardly of the sensor region 22 so that the stresses are accurately reflected in this region.

To improve the magnetic efficiency of the disc the non-sensor side can have the magnetic path at transducer region closed by at least an annulus 38 of high permeability material acting between regions 12 and 14. The part 30 may itself provide this function.

Additional radially spaced regions of opposite polarity may be provided on the disc. These additional regions can form keeper or guard regions. Further discussion of keeper or guard regions will be found in concurrently filed application PCT/GB00/03119 published under the number WO01/13081.

Figure 5:
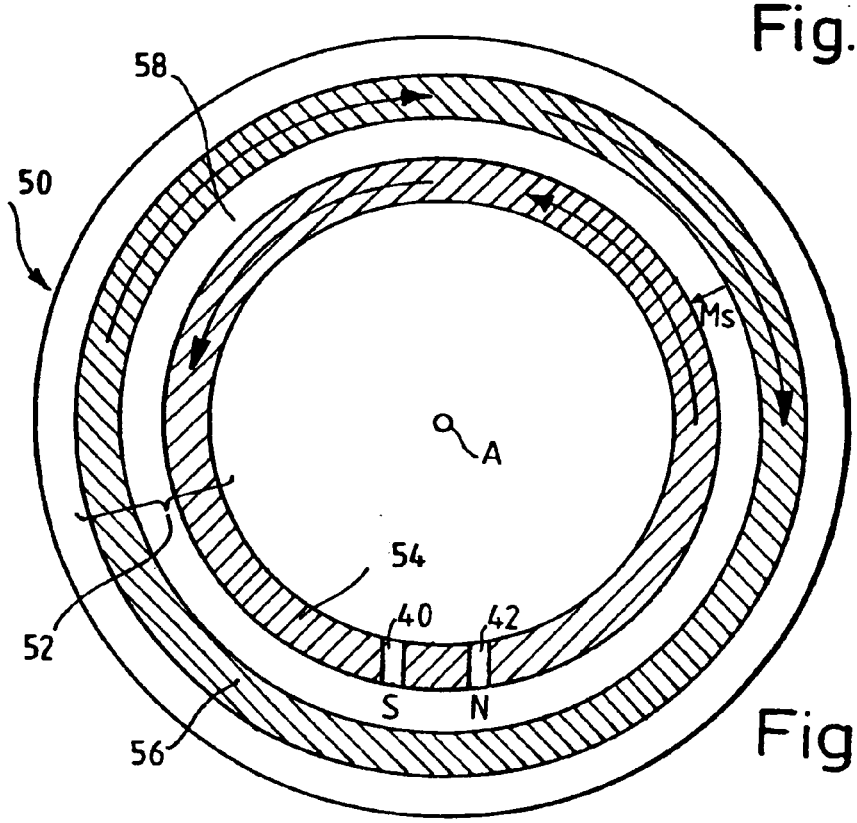
FIG. 5 is a view of another embodiment of the invention using a disc-like member in which the transducer element is formed.

FIG. 5 illustrates how the disc-like torque transducer assembly can be adapted to work with circumferential magnetisation. FIG. 5 is a face view of a disc 50 through which torque is transmitted between a drive applied on the axis A and the periphery or vice versa as previously described. In this embodiment, there is a transducer region 52 which comprises an inner annular region 54 and an outer annular region 56. The circumferential magnetisation may be applied through the face 58 using a U-shaped magnet arrangement in which the North and South poles are aligned normally to a radius as indicated at 40, 42 for annulus 54 rather than being aligned radially as in FIG. 2. Annulus 56 is similarly created, it being understood that the disc is rotated relative to the magnet to magnetise the annulus.

In the absence of torque the circumferential fields in regions 54 and 56 will be trapped within the annular regions. It is assumed here that the magnetisable material exhibits magnetoelasticity. However, under torque the field becomes skewed in the manner well-known with prior art circumferential transducers, e.g. Garshelis U.S. Pat. Nos. 5,351,555, 5,520,059 and 5,465,627. The consequence is that at face 58 the regions 54 and 56 develop magnetic poles of opposite polarity. The polarity is dependent on the direction of torque.

A radial field Ms is generated externally of the surface 58 between regions 54 and 56, the radial magnetic flux direction and magnitude being a function of the torque direction and magnitude. The radial flux can be sensed by sensors disposed as for the radial (reference) flux in FIG. 2. In contrast to FIG. 2 it is seen that the detectable torque-dependent flux is radial, rather than circumferential, but there is no reference field component available.

Figure 6:
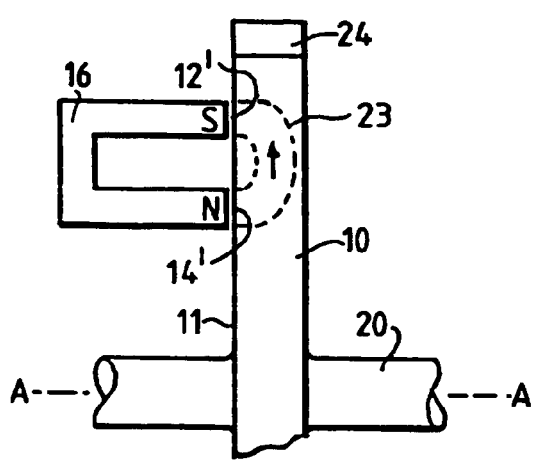
FIG. 6 is a view similar to FIG. 1 showing the use of a single-side magnetising source.

A modification of the magnetising arrangement of FIG. 2 is that shown in FIG. 6 where the disc 10 is subject to a single magnet source at one side, e.g. the magnet 16 adjacent face 11 to produce a magnetised zone 23 closed within the material of the disc as indicated by the dotted lines with two radially spaced annular poles 12' and 14' of opposite polarity between which, as in FIG. 3, an external reference radial field Mr exists and a torque-dependent circumferential or tangential field Ms is produced under torque.

Figure 7:
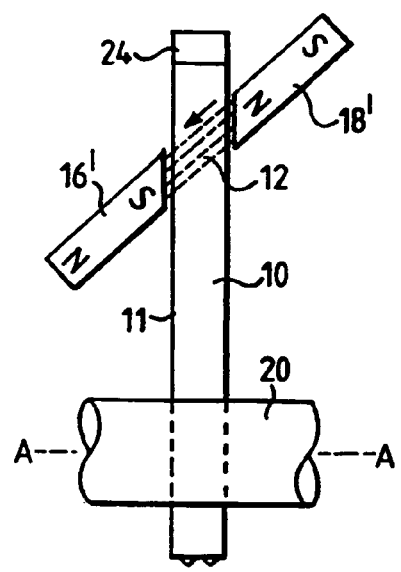
FIG. 7 is a side view of a disc-like torque transmitting structure employing a single magnetised transducer region.

Other modifications are possible. For example, the magnets providing the magnetising source in FIG. 1 could be replaced as indicated in FIG. 7 by a respective single magnet 16', 18' on each side of the disc 10, obliquely disposed with their poles in opposed polarity, so as to create a single annular zone, such as zone 12' at an angle to the direction of torque transmission through the disc. An alternative is to rely on a radial offsetting of the magnets to produce an oblique magnetisation in the disc. Such a zone may also be created by a single magnet pole angled with respect to the plane of the disc on one side only if the disc is thin enough and the magnet strong enough. A single magnet could also be placed parallel to the disc surface to have a flux path closed through the disc which would magnetise the disc to have two radially spaced poles, each being an annular zone.

Figure 8:
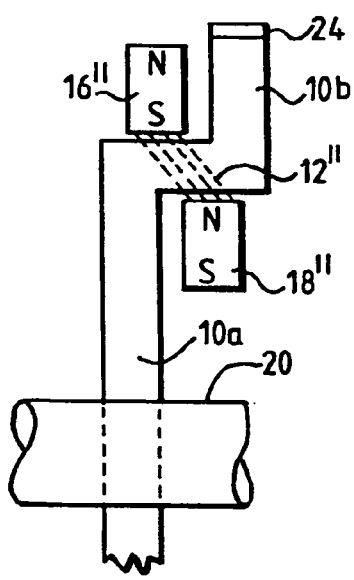
FIG. 8 is a modification of the structure of FIG. 7 in which a stepped structure is employed with a single magnetised transducer region in the step portion.

FIG. 8 illustrates a profiled gear wheel having a central hub portion 10a connected to an outer toothed portion 10b by an intermediate portion 10c providing a step between the portions 10a and 10b which lie in different planes. Similarly to FIG. 7 a pair of magnets 16" and 18" are in this case offset to provide a magnetisation zone 12" at an angle to the direction of torque transmission. It will be noted that the magnets lie within the planes defined by the portions 10a and 10b.

As regards FIG. 8, this illustrates that the invention is applicable to a generally radially extending structure through which radial torque transmission occurs even though the torque may be sensed at a portion of the structure which is not itself radially oriented.

It has been found in practice that even with the single fields of FIGS. 7 and 8 the transmitted torque cause a distortion of the emanated field detectable by an exterior sensor.

Figure 13:
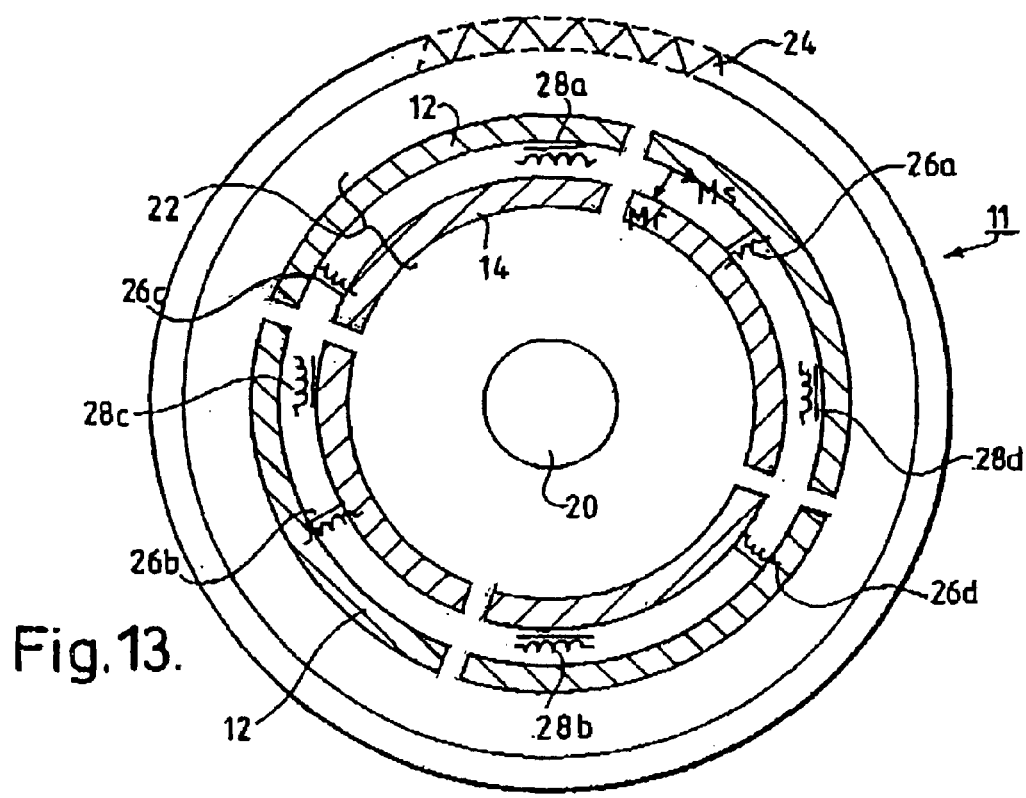
FIG. 13 shows a face view of an alternative transducer assembly side of an alternative disc to that shown in FIG. 1.

Other modifications may be made to the torque sensor arrangements so far described. The disc-like structures discussed above have been complete annuli about the axis, at least where the magnetic transducer element is to be formed. It is possible, however, that the disc-like structure and the magnetised region(s) could be broken in one or more places, as shown in FIG. 13. The requirement is that there be material of the structure extending over at least an angular sector through which a torque transmission path extends and which is capable of magnetisation in one of the ways described above to provide a torque-dependent magnetic field output. The interruption of the annular path into one or more angularly offset sectors may be used to provide a pulse-type of output as the disc-like structure rotates relative to the sensor system so that speed as well as torque measurement may be made.

In the embodiments described above, the disc-like or similar structure is magnetised as required and then operatively used having been removed from the magnetising source or vice versa. In some circumstances it is also contemplated that the magnetising source may remain in place in operative magnetising association with the disc-like structure. This enables the transducer region to be renewed or refreshed each time the structure rotates. The sensor or sensor system is an angularly offset from the magnetising source so as to respond to the torque-dependent magnetic field without being influenced by the source. This continually refreshed transducer may obviate the requirement of using a pre-magnetisation procedure as described below.

What may be conveniently called the disc form of implementing the invention provides the basis of implementing in an essentially planar form various configurations which are analogous to configurations implementable on a rotating shaft. The disc form may also be adapted for stress measurements other than torque. Various implementations of these ideas will now be described.

Figure 9A:
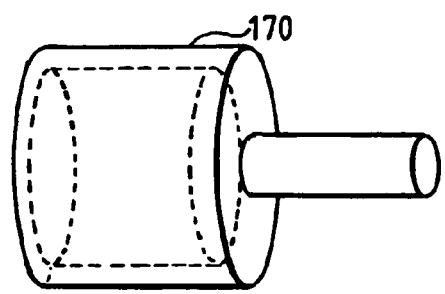
FIGS. 9 to 11 show examples of the implementation of the present invention to the measurement of bending and shearing forces.
Figure 9B:
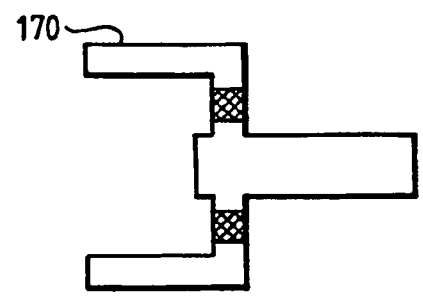
Figure 10:
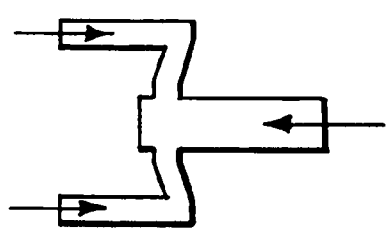
Figure 11:
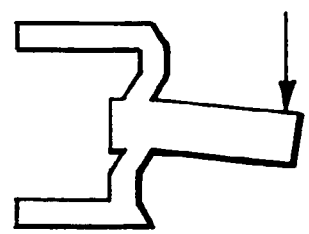
Figure 11A:
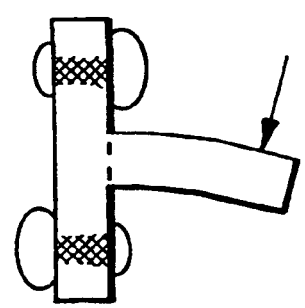

With the disc arrangement generally as shown in FIGS. 1 to 8, it is also possible to measure applied forces other than torque. A suitable arrangement is shown in FIGS. 9 to 11. In this arrangement, a tube 170 is mounted on the disc around the outer magnetised region as shown in FIGS. 9a and 9b. Forces applied to the axle will be transmitted through the disc to the tube 170 and vice versa. As shown in FIG. 10, when an axial force is applied to the axle or the tube 170, or a bending or shearing force is applied as shown in FIG. 11, mechanical stresses will be induced in the disc, resulting in a change to the magnetic flux, for example as shown in FIG. 11a. By detection of the changes in the magnetic flux by magnetic sensors as described previously, the nature and magnitude of these forces can be determined. The precise placement of these sensors adjacent the magnetised region(s) will depend on the nature of the mechanical stress induced in the disc-like structure as well as the mode of magnetisation employed.

Figure 12:
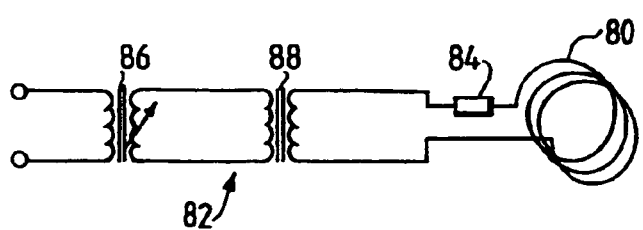
FIG. 12 shows a circuit diagram of apparatus for performing a pre-magnetisation procedure.

In order to achieve optimum transducer performance in terms of consistent and repeatable measurements, it is first desirable to subject the disc or disc-like or plate-like structure (all referred to simply as a disc hereinafter), or at least that part of it relevant to the region or regions to be magnetised, to a pre-magnetisation process by which the disc is magnetically cleansed. One form of apparatus suitable for magnetic cleansing is shown in FIG. 12. The pre-magnetisation process to be described is applicable to a disc in which the required magnetised regions are to be formed. The process to be described will demagnetise or de-gauss a disc in which unknown magnetic field patterns may have been established.

The disc as received may have been subject to various mechanical and/or heat treatment operations which differentially affect the magnetic domains within the material. It may have been subject to and have acquired undefined magnetic fields. Such unknowns will be deleterious to transducer performance. Thus in most cases the disc is to be put through a pre-magnetisation procedure to put it into a magnetically-defined state which has been referred to above as magnetically cleansed.

The degree of demagnetisation required is partially dependent on the magnetisation to be applied thereafter. For example if the magnetic programming to create the transducer element uses a relatively low level of magnetic field strength, the more important it becomes to completely demagnetise the sensor host (the disc). In this context magnetic cleansing means that the de-gaussing or demagnetisation procedure results in that the magnetic direction of the individual grains of the shaft material is random so that no grouping of magnetic domains in any particular direction exists. The existence of magnetic domain grouping to provide some organised magnetic orientation of individual grains leads to deficiencies in the magnetised transducer element. For example, increased offsets of the measured magnetic signal; non-uniformity of the signal as a function of the rotational angle of the shaft; and lower stability over time of the transducer element.

The magnetic cleansing should extend well beyond the region at which the magnetised transducer element is to be formed, e.g. preferably the whole disc should be demagnetised so that there are no undefined local magnet systems in the sensor host. It is possible that such local systems may travel over time in the disc to affect the transducer specification on an ongoing basis. The provision of guard fields as mentioned above, provides a measure to mitigate this possibility if such fields remain even despite magnetic cleansing.

FIG. 12 illustrates an apparatus for magnetic cleansing. It comprises a demagnetising coil 80 wound in hollow solenoid fashion, a mains powered transformer arrangement 82 and a current limiter 84. For an 18 mm. diameter disc a suitable coil was about 300 turns of about 30 cm. diameter of a heavy current carrying capacity cable. The outer conductor of a heavy coaxial cable coiled into a solenoid coil proved to be suitable. The transformer arrangement 82 comprises a variable transformer 86 connected to a 110 or 240 VAC mains AC supply. This is in turn connected to an isolation transformer 88 capable of safely delivering 10 amperes or more at its secondary at voltages at up to say 48V. The coil 80 is connected to the secondary of transformer 88 through the current limiter 84 which may be a resistor, e.g. a power rheostat, or more elaborate electronic device. The current limiter may be omitted provided steps are taken to monitor the current through the coil. A typical coil resistance would be about 100 milliohms. The variability of the transformer arrangement enables the current to be controlled as desired.

The coil 80 is energised and the disc is passed through the coil while the coil is energised at 8–10 A. This produces a de-gaussing field of about 1 kGauss. Typically one is looking to achieve fields in the 500–1200 Gauss range. The disc may be mounted on a movable jig to move it along the axis of the coil and the movement continues as the far end of the disc leaves the coil so that the field to which the shaft is subjected gradually decreases. There may be other ways of achieving the de-gaussing procedure including control of the coil current as a function of the axial position of the disc with respect to the coil.

It will be understood that the coil 80 is sized to accommodate the disc. If this is not practicable, the coil may be moved close to and then away from the disc. A solenoid coil extending helically about an axis may not be the most convenient form to use in this case.

This pre-magnetisation is considered to have more general applicability to a wide range of sensor host shapes (shafts, discs etc.) and to a wide range of magnetic transducer types.

The pre-magnetisation procedure is followed by magnetisation of the disc as described above. Following the magnetisation procedure to be described a post-magnetisation step may be performed in the same manner as the pre-magnetisation procedure but at a lower level of magnetic field.

In the post-magnetisation procedure, the now magnetised disc is again passed axially through the energised solenoid coil 80. However, the AC current through the coil is of an order of a magnitude lower than for the pre-magnetisation procedure. In the pre-magnetisation example given above, the 8–10 A current employed for pre-magnetisation is reduced to say 0.5–1 A for post magnetisation. The current is at a value which does not change the basic magnetic pattern sought to be established but, as best can be surmised, it reduces or knocks-back parasitic fields that may be present after the magnetisation procedure. It has been found that the post-magnetisation step improves the uniformity of the output signal with rotation of the disc, offsets over time and the final sensor stability generally.

As already indicated above, where the disc is continually refreshed by a magnet system as it rotates, the pre-magnetisation procedure above disclosed may not be necessary.

The invention claimed is:

1. A transducer element for a torque or force transducer comprising a member having a structure which extends generally radially of an axis to transmit a stress between a radially inner region of the structure and a radially outer region, and at least one region of permanent magnetisation that is predominantly axially magnetized and disposed between said inner and outer regions to be responsive to the transmitted stress and emanate a stress-dependent magnetic field.

2. A transducer element as claimed in claim 1 in which there are two magnetised regions, a radially inner region and a radially outer region between which a stress-dependent field is established.

3. A transducer element as claimed in claim 1 in which the or each region of permanent magnetisation is arcuate with respect to said axis.

4. A transducer element as claimed in claim 1 in which the or each region of permanent magnetisation is an interrupted annulus.

5. A transducer element as claimed in claim 1 in which the or each region of permanent magnetisation is annular.

6. A transducer element as claimed in claim 1 in which said structure has a generally radially extending surface to which the or each magnetised region extends.

7. A transducer element as claimed in claim 1 in which said member has a generally disc structure.

8. A transducer element as claimed in claim 1 in which there are two regions of permanent magnetisation; each being magnetised in a substantially axial direction and wherein the polarities of magnetisation of the two regions are opposite.

9. A transducer element as claimed in claim 7 in which said structure has two radially-extending surfaces to which the or each region of permanent magnetisation extends and further comprising means located at one of sad two surfaces to close a flux path between the two regions.

10. A transducer element as claimed in claim 1 in which there are two regions of permanent magnetisation radially-spaced apart and having independent closed magnetic circuits of opposite polarity.

11. A transducer element as claimed in claim 9 in which said member is formed of a material, said transducer element having a flux path linking said regions, said flux path being closed within the material of said member.

12. A transducer element for a torque or force transducer comprising a member having a structure which extends generally radially of an axis to transmit a stress between a radially inner region of the structure and a radially outer region, and a single region of permanent magnetisation which extends obliquely to said axis and is disposed between said inner and outer regions to be responsive to the transmitted stress and emanate a stress-dependent magnetic field.

13. A transducer element as claimed in claim 12 in which said structure has a generally disc structure and includes a step portion in which said single region is provided.

14. A stress sensing transducer system comprising a transducer element which is as claimed in claim 1 and which is subject to stress generated between said radially inner and outer regions of said structure through said at least one magnetised region to emanate a torque-dependent magnetic field, and a sensor system comprising one or more magnetic field sensors responsive to said stress-dependent magnetic field to provide a signal representing the stress generated between one and the other of said radially inner and outer regions.

15. A torque sensing transducer system comprising a transducer element which is as claimed in claim 1 and which has a torque transmission path extending from one to the other of said radially inner and outer regions of said structure through said at least one magnetised region to emanate a torque-dependent magnetic field, and a sensor system comprising one or more magnetic field sensors responsive to said stress-dependent magnetic field to provide a signal representing the stress transmitted between one and the other of said radially inner and outer regions.

16. A transducer as claimed in claim 15 in which said member is adapted as a torque transmitting part capable of transmitting a rotational drive applied to said inner region of said structure to a load applied to said outer region thereof or vice versa.

17. A transducer as claimed in claim 14 in which said member is disc-shaped.

18. A transducer system as claimed in claim 14 in which said one or more magnetic field sensors is disposed and oriented to detect a circumferential magnetic field component and provide a signal representing same.

19. A torque or force transducer element comprising
a member adapted to transmit torque or force applied along, on or about an axis extending through the member to a portion of the member spaced from said axis, or vice versa,
said member having a surface transverse to said axis,
a first, outer, region located between said axis and said portion and extending to said surface;
a second, inner, region located between said axis and said outer region and extending to said surface; and
first and second annular regions that are predominantly axially magnetised and having independent closed magnetic circuits with opposite polarity to generate a magnetic field component which is a function of said torque or force.

20. A transducer element as claimed in claim 19 in which said first and second regions are annular and encircle said axis, or at least one of the annular regions is an interrupted annulus, or said first and second regions are arcuate with respect to said axis.

21. A transducer element as claimed in claim 19 wherein said first and second predominantly axially magnetised regions develop a radial magnetic field component extending there between at said surface and a circumferential magnetic field component at said surface that is a function of torque.

22. A torque or force transducer assembly comprising
first and second members coaxially disposed,
said first member being of greater diameter than said second member,
a disc member extending generally radially of said axis and connecting said first member to said second member for transmitting force from one member to the other, said disc member comprising two magnetized regions that are at least arcuate or part annular,
said magnetized regions having a predominantly axial magnetization such that the regions cooperate to generate a magnetic field component that is a function of a stress established in transmitting a load between said first and second members.

23. A transducer assembly as claimed in claim 22 in which said assembly is adapted to transmit torque from one of said members to the other.

24. A transducer assembly as claimed in claim 22 in which said first and second members are disposed to cause flexing of said disc member in response to a relative displacement of said first and second members away from axial alignment.

25. A transducer assembly as claimed in claim 22 in which said first and second members are disposed to cause flexing of said disc member in response a relative displacement of said first and second members away from axial alignment.

* * * * *